United States Patent 3,591,507
Patented July 6, 1971

3,591,507
FLAME-RESISTANT COMPOSITIONS COMPRISING 1,2 BIS(3,4 - DIBROMOCYCLOHEXYL)-1,2-DIBROMOETHANE AND ANTIMONY TRIOXIDE

William O. Drake and Ernest A. Zuech, Bartlesville, Okla., assignors to Phillips Petroleum Company
No Drawing. Continuation-in-part of application Ser. No. 676,615, Oct. 19, 1967, which is a continuation-in-part of application Ser. No. 502,526, Oct. 22, 1965. This application July 23, 1969, Ser. No. 844,168
The portion of the term of the patent subsequent to Jan. 23, 1985, has been disclaimed
Int. Cl. C09k 3/28
U.S. Cl. 252—8.1
6 Claims

ABSTRACT OF THE DISCLOSURE 1,2 - bis(3,4 - dibromocyclohexyl) - 1,2 - dibromoethane (BrBCE) and $Sb_2O_3$ are used to flame-proof compositions having a flammable organic base.

---

This application is a continuation-in-part of copending application Ser. No. 676,615, filed Oct. 19, 1967, now abandoned, which in turn is a continuation-in-part of copending application Ser. No. 502,526, filed Oct. 22, 1965, now abandoned.

This invention relates to the flameproofing of compounds such as plastics. In one aspect it relates to the flame-proofing of synethtic thermoplastic polymers with certain organic halide compounds.

It is known that readily flammable plastics can be made difficultly flammable by the addition of halogen compounds. Flame-proofed plastic compositions are important, especially for the production of electrical insulating coatings which find applications such as in house wiring, for small appliances, electronic equipment wire insulation, jacketing and the like.

Halogen compounds which are known to be suitable as agents for the flame-proofing of plastics include highly chlorinated nonvolatile hydrocarbon compounds. Compounds that are heretofore particularly suitable for the flame-proofing of plastics include brominated linear polybutadienes of a polymerization degree of 3-10 and brominated cyclic polybutadienes such as hexabromocyclododecane. In addition, 2,4,6-tribromoaniline has been found suitable for the flame-proofing of plastics. However, it is not possible to use all bromine compounds as flame-proofing agents. Suitable compounds for the flame-proofing of plastics must, above all, have the following properties: They must be relatively non-volatile and odorless and must not detrimentally affect the mechanical properties of the plastics. They must be sufficiently effective in the smallest possible amounts. They must not promote corrosion. Hardly any of the organic bromine compounds that are known to have a flame-proofing effect have all these properties to a sufficient extent. Some of the compounds are volatile so that the plastics treated with same lose their flame resistance after a little time. Some of the compounds have an unpleasant odor. A large number of known bromine compounds have a plasticizing effect. For the production of expanded materials from granular or bead-like expandable thermoplastics flame-proofing agents with plasticizing properties are unsuitable because they yield expanded articles of insufficient compressive strength and volume stability.

It is an object of this invention to provide flame-proofed compositions which do not lose their flame-proofness in storage.

A further object of this invention is to provide flame-proofed compositions which are odorless and do not promote corrosion.

A still further object of this invention is to provide flame-proofed compositions whose mechanical properties are not detrimentally affected by the admixture of the flame-proofing agent.

Other objects, advantages, and features of our invention will be apparent to those skilled in the art from the following discussion.

It is to be understood that this invention is to be broadly applicable to compositions, including homopolymers and copolymers, preferably those selected from the group consisting of polyethylenes, polypropylenes, copolymers of ethylene and butene, polyisobutylenes and polystyrenes, and polymers of monomers comprising at least one of conjugated diene, preferably having 4 to 10 carbon atoms per molecule, inclusive, monovinyl subtituted aromatic compound, preferably having 8 to 12 carbon atoms per molecule, inclusive, acrylonitrile, methyl acrylate and methyl methacrylate; preferably homopolymers of butadiene, isoprene, decadiene, styrene, vinylnaphthalene, acrylonitrile, methyl acrylate, and methyl methacrylate; and copolymers (random, block, or graft) of butadiene and styrene, of butadiene, styrene, and acrylonitrile, of acrylonitrile and vinylpyridine, and of acrylonitrile and vinyl chloride. Blends or mixtures of the above compositions can also be used in this invention.

It is to be understood that this invention is to be broadly applicable to compositions which are normally flammable organic materials, including polymeric materials, cellulosic materials, natural fibers, regenerated fibers, man-made fibers, man-made resins, and the like. Some specific examples are wood; linen and jute fabrics; flax, silk, wool and cotton fibers; rayon, nylon, vinyls or acrylics, and the like.

The compositions can be polymers of polyolefins, polyacrylonitrile, polymethyl acrylate or polymethyl methacrylate. More specifically, the composition can be at least one polymer of conjugated dienes, preferably having 4 to 10 carbon atoms per molecule; monovinyl substituted aromatic compounds, preferably having 8 to 12 carbon atoms per molecule, acrylonitrile, methyl acrylate, methyl methacrylate, copolymers of acrylonitrile and vinyl-pyridine or copolymers of acrylonitrile and vinyl chloride. The composition can also be at least one polymer of polyethylene, polypropylene, polyisobutylene, polystyrene, polybutadiene, polyisoprene, copolymer of butadiene and styrene, copolymer of butadiene, styrene, and acrylonitrile or copolymers of ethylene and butene.

The composition can also be a cellulosic material such as alpha-cellulose paperboard.

Other compositions that can be flame-proofed according to this invention are epoxy resins and polyester resins.

The epoxy resins have the general formula $$CH_2 \overset{O}{\diagdown} CH(CH_2)_n-[OR'O(CH_2)_nCHCH_2]_m-OR'O(CH_2)_nCH \overset{O}{\diagdown} CH_2$$

wherein $n$ is an integer from 1 to 10, $m$ is an integer from 0 to 20, and R' is a divalent organic radical derived from a dihydric phenol. When derived from polycyclic dihydric phenols, R' has the formula

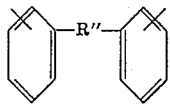

wherein R" is a carbon-to-carbon bond, a divalent aliphatic radical, or a divalent aromatic radical. The divalent organic radical R' also can be

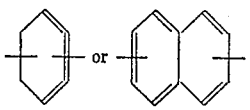

The aromatic rings can be ring-substituted with lower alkyl groups and halogens. A specific example of an epoxy resin that can be employed in this invention is diglycidyl ether of 4,4'-isopropylidenephenol.

A typical polyester resin is the reaction product of phthalic anhydride, maleic anhydride, and propylene glycol which has been cross-linked with a monomer such as styrene using a peroxide catalyst.

The copolymers of this invention can be random, block or graft polymers. Further, blends or mixtures of the above-described compositions can also be employed in this invention.

We have now found that these compositions can be rendered flameproof by using a compound of halogenated bis(cycloalkenyl) in amounts of 1.5 to 20, preferably 1.5 to 3, parts by weight per 100 parts by weight of the composition and which compound has the following general formula:

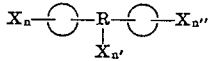

in which the circles represent cycloalkyl groups having 5 to 8 carbon atoms in the ring, X represents chlorine or bromine substituted on the carbon atoms, R is a saturated divalent acyclic hydrocarbon radical having 1 to 4 carbon atoms, and the values of $n$, $n'$, and $n''$ are selected such that the total halogen content of the compound is in the range of 30 to 90 weight percent. Examples of compounds that can be used are:

bis(2,5-dibromocyclopentyl)dibromoethane
1,2-bis(3,4-dibromocyclohexyl)-1,2-dibromoethane
1-(3,5-dibromocyclohexyl)-2-(3,5-dichlorocyclohexyl)ethane
bis(2,4,6-tribromocycloheptyl)methane
1,3-bis(3,5,7-trichlorocyclooctyl)-2,2-dibromopropane
2,3-bis(2,3,4,5,6-pentachlorocyclohexyl)-1,4-dibromobutane
1,4-bis(2,3,4,5,6,7,8-heptabromocyclooctyl)-1,2,3,4-tetrabromobutane
1-(2,5-dichlorocyclopentyl)-2-(3,4-dibromocyclohexyl)-3-bromopropane
1,3-bis(3,4,5-tribromocyclohexyl)-2-dibromomethylpropane and the like.

It is also within the scope of this invention to incorporate the halogenated compound together with antimony trioxide in the composition. The antimony trioxide is used in amounts of 0.5 to 20 parts per 100 parts of composition. The halogenated compound shall be used in such an amount in admixture with the compositions that the total available halogen in the formulation is at least 0.2 weight percent. A weight ratio of halogen compound to antimony oxide of 2/1 is frequently used, but other ratios are operable. It is of advantage, especially in the manufacture of expanded articles from expandable granular or bead-like polymers, that only this small amount of this flame-proofing agent is required. The expanded materials are not weighted by the flame-proofing agent and can therefore be produced with practically the same bulk densities as expanded materials without flame-proofing additions thereto. Moreover, this small amount of flame-proofing agent will not produce an appreciable plasticizing effect. Expanded polypropylene which has been flame-proofed by means of the bromine compounds according to the present invention shows good compressive strength and volume stability. The flame-proofing agents according to the present invention are relatively nonvolatile and practically odorless.

The production of the flame-proofed compositions can be carried out in various manners. For example, intimate mixtures of composition and flame-proofing agents according to the present invention can be prepared by mixing the composition and the bromine compound at an elevated temperature in an extrusion press or a kneader. The two components can also be dissolved in a common solvent, the solution admixed with the polymer, and the solvent subsequently removed. In the case of granular or bead-like plastic compositions, the surface of the granule may be coated.

It is to be understood that the mixture of this invention can also have the usual fillers, dyes, pigments, plasticizers, antistatic agents, stabilizing agents and the like incorporated therein, if desired. These compounds are well known in the art and for the sake of brevity will not be repeated at this time.

The invention is demonstrated in the following examples, but it is to be understood that the invention is not limited to these specific examples. The parts specified in the examples are parts by weight per 100 parts of composition.

EXAMPLE I

A compound 1,2-bis(3,4-dibromocyclohexyl)-1,2-dibromoethane was made by brominating bis-1,2(3-cyclohexenyl)ethylene in a chloroform-ethanol mixture containing aluminum chloride. This compound melted at 242–244° C. with decomposition and had the following elemental analysis:

Calculated (percent): C, 25.2; H, 3.0; B, 71.8. Found (percent): C, 25.9; H, 3.1; B, 71.2.

Polypropylene was prepared by polymerization of propylene in the presence of diethylaluminum chloride and a complex having the approximate formula $TiCl_3 \cdot \frac{1}{3} AlCl_3$. This polymer contained the following stabilizers:

| | Weight percent |
|---|---|
| Ditertiarylbutyl-p-cresol | 0.1 |
| Dioctylphosphite | 0.1 |
| 1,1,3 - tris(2 - methyl-4-hydroxy-5-tert-butyl-phenyl) butane | 0.2 |
| Distearylthiodipropionate | 0.4 |

Antimony oxide and the 1,2-bis(3,4-dibromocyclohexyl)-1,2-dibromoethane (BrBCE) compound were mixed with the polymer fluff in an acetone slurry and the acetone was then evaporated with occasional stirring. The mixture was then blended under nitrogen in a Brabender Plastograph for 10 minutes at 190° C. and 50 r.p.m. After blending the formulations were chopped and molded at 220° C. under 25 tons force (over the total platen area) into 5-inch x 5-inch x 0.125-inch slabs. These slabs were cut into bars 0.5-inch wide and tested for flame retardation by a method described in ASTM D 635–56T. In this test the 5-inch bars are marked one inch from each end and burned 30 seconds at one end. If, after two 3-second ignitions, the flame is extinguished before reaching the first mark, the formulation is considered "non-burning." If the flame reaches the second mark, the formulation is considered "burning." If the flame goes out between the first and second marks (that is, between one inch and four inches from the point of ignition), the formulation is considered "self-extinguishing," and the distance burned is reported as "extent of burning." The following table illustrated the results of these tests:

| Run No. | Additive, phm.[a] | | Classification |
|---|---|---|---|
| | Sb$_2$O$_3$ | BrBCE | |
| 1 | 0.5 | 1.0 | Burning. |
| 2 | 0.75 | 1.5 | Non-burning. |
| 3 | 1.0 | 2.0 | Do. |

[a] Parts by weight per 100 parts polymer.

EXAMPLE II

Another sample of 1,2-bis(3,4-dibromocyclohexyl)-1,2-dibromoethane was prepared by mixing 188 gm. of bis-1,2(3-cyclohexenyl)ethylene, 700 ml. of chloroform, and 5 gm. of sodium bicarbonate, cooling to −5° C., and brominating with a solution containing 480 gm. of bromine and 250 ml. of chloroform. The bromination was carried out by adding the brominating solution dropwise over a 4-hour period of time at a temperature in the range of −5 to 0° C. After all the brominating solution was added the mixture was stirred for one hour at 0° C. The compound thus formed was separated from the reaction mixture by filtration, and found to have a melting range of 215 to 220° C. with decomposition.

A graft copolymer of acrylonitrile, butadiene, and styrene prepared by Marbon Chemical Division of Borg-Warner Corporation and identified as "Cycolac T" was used; it had the following properties:

| | |
|---|---|
| Melt flow, dg./min.[a] | 2.34 |
| Flexural modulus, p.s.i.[b] | 287,000 |
| Tensile strength, p.s.i.[c] | 5,470 |
| Elongation, percent[d] | 7 |
| Izod impact, ft. lb./in. notch[e] | 5.41 |
| Hardness, Shore D[f] | 78 |
| Density, g./cc.[g] | 1.038 |

[a] ASTM D 1238-62T, using 5 kg. weight at 200° C.
[b] ASTM D 790-63.
[c] ASTM D 638-61T.
[d] ASTM D 638-61T.
[e] ASTM D 256-56.
[f] ASTM D 1706-61.
[g] ASTM D 1505-63T.

Antimony trioxide and the 1,2-bis(3,4-dibromocyclohexyl)-1,2-dibromoethane (BrBCE) compound were mixed with the graft copolymer in a Brabender Plastograph under nitrogen for 5 minutes at 180° C. and 50 r.p.m.

After mixing the formulations were compression molded into slabs and tested in the same manner as set forth and discussed in Example I. The following table illustrates the results of these tests:

| Run No. | Additive, php.[a] | | Classification |
|---|---|---|---|
| | Sb$_2$O$_3$ | BrBCE | |
| 1 | 0 | 0 | Burning. |
| 2 | 7.5 | 15 | Non-burning. |
| 3 | 10 | 10 | Do. |
| 4 | 5 | 10 | Self-extinguishing. |

[a] Parts by weight per 100 parts polymer.

EXAMPLE III

Another sample of 1,2-bis(3,4-dibromocyclohexyl)-1,2-dibromomethane was prepared according to the procedure of Example I. Alpha cellulose paperboard was treated with 15 parts by weight of BrBCE per 100 parts of paperboard and 15 parts by weight of antimony oxide per 100 parts of paperboard. Untreated paperboard was ignited and consumed in a few seconds. Treated paperboard would glow upon ignition, but would not support a flame. About 1¾ inches of treated paperboard charred before the glow self-extinguished. This formulation is considered 'self-extinguishing" under the classifications described in Example I.

EXAMPLE IV

A sample of 1,2-bis(3,4 - dibromocyclohexyl)-1,2-dibromomethane (BrBCE) was prepared according to the procedure of Example I. The flame-retardant effectiveness of BrBCE for various compositions was determined according to the mixing and testing procedures described in Example I. In all cases, an equal amount, by weight of antimony trioxide was added along with the BrBCE. The following table illustrates the results of these tests:

Polystyrene

| Php.[a] | Additive | Classification |
|---|---|---|
| 0 | BrBCE | Burning. |
| 1 | BrBCE | Do. |
| 2 | BrBCE | Self-extinguishing. |
| 3 | BrBCE | Do. |
| 3 | BrBCE | Do. |
| 4 | BrBCE | Non-burning. |

Polymethyl methacrylate

| | | |
|---|---|---|
| 0 | BrBCE | Burning. |
| 5 | BrBCE | Do. |
| 10 | BrBCE | Do. |
| 15 | BrBCE | Non-burning. |

Reaction product of phthalic anhydride, Maleic anhydride and propylene glycol[b]

| | | |
|---|---|---|
| 0 | BrBCE | Burning. |
| 2.5 | BrBCE | Do. |
| 5 | BrBCE | Self-extinguishing. |
| 7.5 | BrBCE | Non-burning. |

Diglycidyl ether of 4,4'-isopropylidene-diphenol

| | | |
|---|---|---|
| 0 | BrBCE | Burning. |
| 5 | BrBCE | Do. |
| 7.5 | BrBCE | Do. |
| 10 | BrBCE | Non-burning. |

[a] Parts by weight per 100 parts polymer.
[b] Crosslinked with styrene using a peroxide catalyst.

These results demonstrate that BrBCE and antimony trioxide are effective flame retardant additives for the disclosed compositions.

As will be evident to those skilled in the art, various modifications of this invention can be made, or followed, in the light of the foregoing disclosure and discussion, without departing from the spirit or scope thereof.

We claim:

1. A flame-resistant mixture comprising a normally flammable organic composition which can be a polyolefin, polyacrylonitrile, polymethyl acrylate, polymethyl methacrylate, a copolymer of acrylonitrile with vinylpyridine, vinyl chloride or butadiene and styrene, cellulosic material, an epoxy resin, nylon, or a polyester resin or mixtures of one or more of said flammable materials; 1.5 to 20 parts by weight per 100 parts by weight of the composition of halogenated bis(cycloalkenyl)substituted olefins having the formula

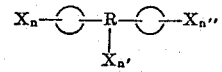

in which the circles represent cycloalkyl groups having 5 to 8 carbon atoms in the ring, X represents chlorine or bromine substituted on the carbon atoms, R is a saturated divalent acyclic hydrocarbon radical having 1 to 4 carbon atoms, and the values of $n$, $n'$, and $n''$ are selected such that the total halogen content of the compound is in the range of 30 to 90 weight percent wherein the total available halogen is at least 0.2 weight percent of said mixture; and 0.5 to 20 parts per 100 parts of the composition of antimony trioxide, the combined amounts of the compound and the antimony trioxide being effective to render the composition flame-resistant.

2. A mixture according to claim 1 wherein said composition can be at least one polymer of conjugated dienes having 4 to 10 carbon atoms per molecule, monovinyl substituted aromatic compounds having 8 to 12 carbon atoms per molecule, acrylonitrile, methyl acrylate, methyl methacrylate, copolymers of acrylonitrile and vinylpyridine or copolymers of acrylonitrile and vinyl chloride; epoxy resins having the formula

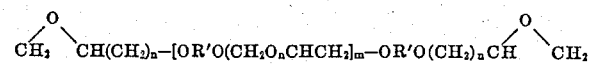

wherein $n$ is an integer from 1 to 10, $m$ is an integer from 0 to 20, and R' is a divalent organic radical derived from a dihydric phenol; or the reaction product of phthalic anhydride, maleic anhydride, and propylene glycol which has been crosslinked with styrene using a peroxide catalyst.

3. A mixture according to claim 1 wherein the composition is at least one polymer of polyethylene, polypropylene, polyisobutylene and polystyrene, polybutadiene, polyisoprene, copolymer of butadiene and styrene, copolymer of butadiene, styrene, and acrylonitrile, or copolymer of ethylene and butene or diglycidyl ether of 4,4′-isopropylidene-diphenol.

4. A flame-resistant polymer mixture according to claim 1 comprising polypropylene in admixture with 1.5 to 3 parts by weight per 100 parts of polypropylene of 1,2-bis(3,4 - dibromocyclohexyl)-1,2-dibromoethane and 0.5 to 20 parts by weight per 100 parts of polypropylene of antimony trioxide.

5. A flame-resistant polymer mixture according to claim 4 wherein said polypropylene contains 1.5 parts 1,2 - bis(3,4 - dibromocyclohexyl) - 1,2 - dibromoethane and 0.75 part antimony trioxide.

6. A flame-resistant polymer mixture according to claim 1 comprising a graft copolymer of butadiene, styrene, and acrylonitrile in admixture with 1.5 to 3 parts by weight per 100 parts of a graft copolymer of butadiene, styrene, and acrylonitrile of 1,2-bis(3,4-dibromocyclohexyl)-1,2-dibromoethane and 0.5 to 20 parts by weight per 100 parts of a graft copolymer of butadiene, styrene, and acrylonitrile of antimony trioxide.

References Cited

UNITED STATES PATENTS

| | | | |
|---|---|---|---|
| 2,480,298 | 8/1949 | Happoldt | 260—28.5 |
| 3,034,939 | 5/1962 | Newkirk et al. | 161—403X |
| 3,313,857 | 4/1967 | Gelfand | 260—648 |
| 3,354,191 | 11/1967 | Stivers | 161—403X |
| 3,361,847 | 1/1968 | Zimmeman | 252—8.1X |
| 3,388,137 | 6/1968 | Schmerling | 252—8.1X |
| 3,445,482 | 5/1969 | Schmerling | 252—8.1X |

OTHER REFERENCES

"Modern Plastics Encyclopedia," 1961 edition, "Flameproofing Polymers," by Mack, pp. 408–411.

JOHN T. GOOLKASIAN, Primary Examiner

D. J. FRITSCH, Assistant Examiner

U.S. Cl. X.R.

106—15; 260—45.75

19668 ALR

UNITED STATES PATENT OFFICE

CERTIFICATE OF CORRECTION

Patent No. 3,591,507　　　　　　　　　　　　　　Dated: July 6, 1971

William O. Drake et al

It is certified that error appears in the above-identified patent and that said Letters Patent are hereby corrected as shown below:

Claim 6, column 7, line 24, "a" should read --- said ---; column 8, line 2, "a" should read --- said ---.

Signed and sealed this 2nd day of May 1972.

(SEAL)
Attest:

EDWARD M. FLETCHER, JR.　　　　　　　　　ROBERT GOTTSCHALK
Attesting Officer　　　　　　　　　　　　　　Commissioner of Patents